Patented Feb. 5, 1935

UNITED STATES PATENT OFFICE 1,990,256

INDIGOID DYESTUFF

Ernst Stoecklin, Binningen, near Basel, Hans Veraguth, Basel, and Fritz Grieshaber, Riehen, near Basel, Switzerland, assignors to Society of Chemical Industry in Basle, Basel, Switzerland No Drawing. Application June 21, 1933, Serial No. 676,978. In Switzerland July 15, 1932

7 Claims. (Cl. 260—53)

This invention relates to the manufacture of unsymmetrical indigoid dyestuffs by condensing a 4,7-dialkyl-3-hydroxythionaphthalene of the general formula

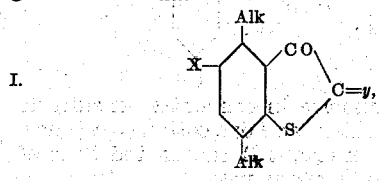

wherein X represents hydrogen or halogen and

represents a reactive grouping, for example

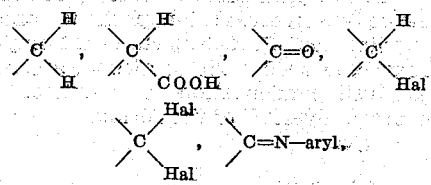

with a 3-hydroxythionaphthene of the general formula

in which R represents any aryl-residue and

has the same significance as

but must be present in a stage of oxidation different from that of

If desired, the dyestuff thus obtained is treated with a halogenating agent.

4,7-dialkyl-3-hydroxythionaphthenes of the general formula I are, for example, 4,7-dimethyl-3-hydroxythionaphthene, 4,7-diethyl-3-hydroxythionaphthene, 4,7-diethyl-5-chloro-3-hydroxythionaphthene, 4,7-dimethyl-5-chloro-3-hydroxythionaphthene, 4,7-dimethyl-5-bromo-3-hydroxythionaphthene-2-carboxylic acid, 2-(para-diamethylamino-) anil of 4,7-dimethyl-5-chloro-3-hydroxythionaphthene (which may be made, for instance by the action of para-nitroso-dimethylaniline on 4,7-dimethyl-5-chloro-3-hydroxythionaphthene), 4,7-dimethyl-5-chloro-thionaphthenequinone (which may be made, for example by saponifying the 2-(para-dimethylamino-) anil of 4,7-dimethyl-5-chloro-3-hydroxythionaphthene with dilute mineral acid), and the dichloride of 4,7-dimethyl-5-chloro-3-hydroxythionaphthene, which is formed by treating the latter with a halogenating agent.

3-hydroxythionaphthenes of the general Formula II are, for example, 3-hydroxythionaphthene, 5-methyl-6-chloro-3-hydroxythionaphthene, 2-(para-dimethylamino-)-anil of 5-chloro-7-methyl-3-hydroxythionaphthene, 4-methyl-6-chloro-3-hydroxythionaphthene, 2-(para-dimethylamino-) anil of 7-chloro-4,6-dimethyl-3-hydroxythionaphthene obtainable by treating the latter with para-nitroso-dimethylaniline, 6-chloro-3-hydroxythionaphthene-2-carboxylic acid, 1,2-naphthioindoxyl, 2,1-naphthionindoxyl, 2,3-naphthioindoxyl, 2,1-anthracenethioindoxyl and 2,3-anthraquinonethioindoxyl.

The condensation takes place by heating the components in a solvent which may act as condensing agent.

The dyestuffs thus obtained correspond with the general formula

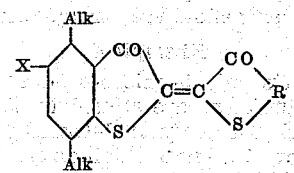

wherein X represents hydrogen or halogen and R an aryl radical.

The dyestuffs of this invention dye very various tints and the dyeings obtained are characterized by very good properties of fastness. The dyestuffs can be converted by known methods into leucoester salts.

The following examples illustrate the invention, the parts being by weight:—

Example 1

344 parts of 2-(para-dimethylamino-) anil of 5-chloro-4,7-dimethyl-3-hydroxythionaphthene are heated to boiling with 234.5 parts of 1-chloro-2,3-naphthionindoxyl in 8000 parts of benzene. When condensation is complete the dyestuff of the formula

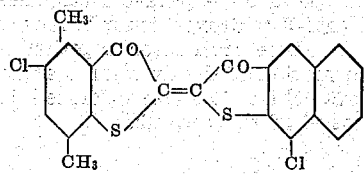

is filtered, washed and dried. It is a red violet powder, soluble in concentrated sulfuric acid to a green solution. It forms an orange-brown vat and dyes cotton full blue violet tints of good fastness.

Example 2

212.5 parts of 5-chloro-4,7-dimethyl-3-hydroxythionaphthene and 320 parts of 2-(para-dimethylamino-)anil of 5-chloro-7-methyl-3-hydroxythionaphthene are stirred in 5200 parts of benzene at about 80° C. until condensation is finished. After filtration, washing and drying, the dyestuff of the formula

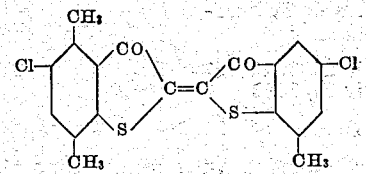

is obtained in the form of a violet powder, soluble in concentrated sulfuric acid to a blue-green solution. In a green yellow vat cotton is dyed full violet red tints of very good properties of fastness.

Example 3

212.5 parts of 5-chloro-4,7-dimethyl-3-hydroxythionaphthene and 326 parts of 2-(para-dimethylamino-)anil of 6-ethoxy-3-hydroxythionaphthene are heated to boiling in 8000 parts of benzene until condensation is complete. The dyestuff of the formula

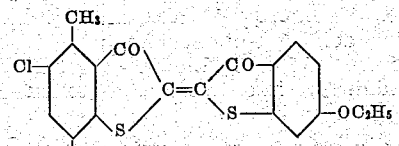

is filtered, washed and dried. The brilliant yellow red powder dissolves in concentrated sulfuric acid to a grass green solution and dyes cotton in a green yellow vat strong rose tints.

Example 4

212.5 parts of 5-chloro-4,7-dimethyl-3-hydroxythionaphthene are stirred in 8000 parts of benzene with 330 parts of 2-(para-dimethylamino-)anil of 1,2-naphthioindoxyl at boiling temperature until condensation is complete. The filtered, washed and dried dyestuff of the formula

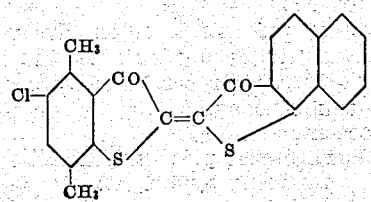

is in the form of a brownish-violet powder, soluble in concentrated sulfuric acid to a yellowish green solution and dyeing cotton in a green yellow vat dark Bordeaux red tints of very good fastness.

Example 5

178 parts of 4,7-dimethyl-3-hydroxythionaphthene, 296 parts of 2-(para-dimethylamino-)anil of 7-methyl-3-hydroxythionaphthene and 4000 parts of benzene are heated together to boiling. When formation of the dyestuff is at an end, the precipitate which has been formed is filtered. The dyestuff of the formula

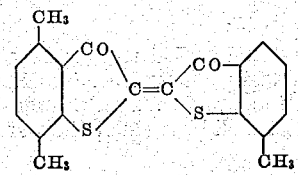

is an orange red powder soluble in concentrated sulfuric acid to a green solution and dyeing cotton in a yellow vat rose tints. By action of an halogenating agent on this dyestuff there may be obtained, for example 4,7-dimethyl-5'-bromo-7'-methyl-bis-thionaphtheneindigo of the formula

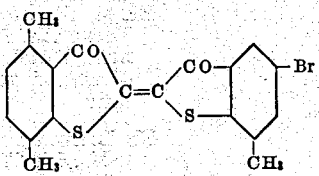

and 4,7-dimethyl-5,5'-dibromo-7'-methyl-bis-thionaphtheneindigo of the formula

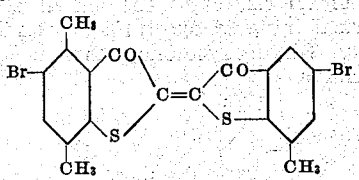

these dyestuffs dissolve in concentrated sulfuric acid to a green solution and dye cotton in a yellow vat brilliant red or bright Bordeaux red tints of very good properties of fastness.

Example 6

310 parts of 2-(para-dimethylamino-)anil of 4,7-dimethyl-3-hydroxythionaphthene, obtainable by action of para-nitroso-dimethylaniline on 4,7-dimethyl-3-hydroxythionaphthene and of melting point 208° C., 200 parts of 2,1-naphthioindoxyl and 5000 parts of alcohol are boiled together until condensation is complete. The reddish-brown dyestuff of the formula

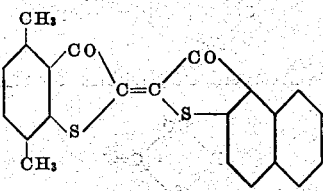

dissolves in concentrated sulfuric acid to a blue solution and dyes cotton in a red orange vat beautiful yellowish red-brown tints of very good fastness to chlorine, washing, kier-boiling and light.

Example 7

310 parts of 2-(para-dimethylamino-)anil of 4,7-dimethyl-3-hydroxythionaphthene, 235 parts of 1-chloro-2,3-naphthionindoxyl and 6000 parts of alcohol are boiled together until condensation is complete. The filtered red-violet dyestuff of the formula

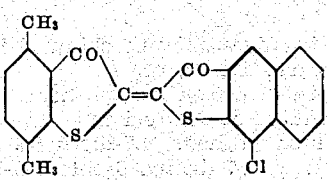

dissolves in concentrated sulfuric acid to a bright green solution and dyes cotton in an orange brown vat red-violet tints of very good properties of fastness.

When this dyestuff is dissolved in sulfuric acid and the solution is treated with bromine there is obtained a violet powder soluble in concentrated sulfuric acid to a bright green solution and dyeing cotton in a gold yellow vat strong blue-violet tints of very good fastness.

The following table displays further examples of dyestuffs obtainable in accordance with the invention:—

| 2-(para-dimethylamino-)anil of 5-chloro-4,7-dimethyl-3-hydroxythionaphthene and: | Color of the dyestuff | Color in sulfuric acid | Color of the vat | Color of the dyeing on cotton |
|---|---|---|---|---|
| I. 6-chloro-4-methyl-3-hydroxythionaphthene. | Rose. | Green. | Reddish-yellow. | Bluish-rose. |
| II. 2,-1-naphththioindoxyl. | Dark Bordeaux red. | Green. | Brown-orange. | Bluish-Bordeaux red. |
| 5-chloro-4,7-dimethyl-3-hydroxythionapthene and: | | | | |
| III. 2-(para-dimethylamino-)anil of 6-chloro-5-methyl-3-hydroxythionaphthene. | Rose. | Grass-green. | Greenish yellow. | Yellowish red violet. |
| IV. 2-(para-dimethylamino-)anil of 8-chloro-1,2-naphthioindoxyl. | Grey-violet. | Green. | Orange-brown. | Red-violet. |
| V. 2-(para-dimethylamino-)anil of 4,7-dimethyl-3-hydroxythionaphthene. | Bluish-rose. | Green. | Pale yellow. | Bluish-rose. |
| 2 (para-dimethylamino-)anil of 4,7-dimethyl-3-hydroxythionaphthene and: | | | | |
| VI. 4-methyl-6-choloro-3-hydroxythionaphthene. | Red. | Green. | Yellow. | Rose. |
| VII. 4-methyl-6-chloro-3-hydroxythionaphthene+bromine. | Red. | Green. | Yellow. | Red. |

The dyestuffs Nos. I to VII of the table correspond with the following formulæ:—

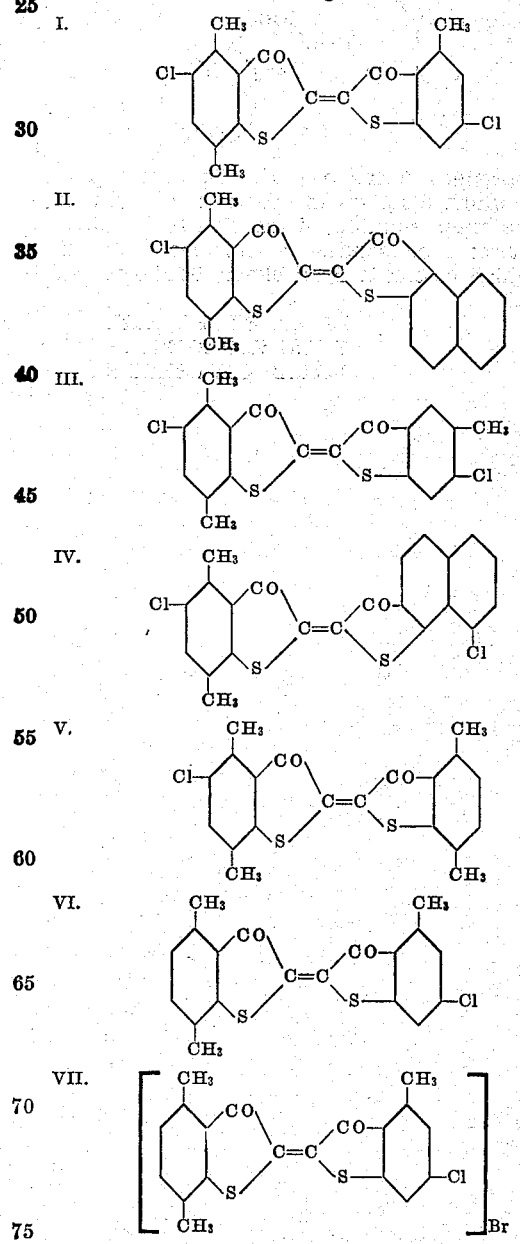

Example 8

5 parts of the dyestuff described in Example 1 are made into a paste with 20 parts of caustic soda solution of 33 per cent. strength. The paste is mixed with 750 parts of water at 70° C. and 15 parts of sodium hydrosulfite, and the whole is allowed to stand for 30 minutes and then diluted to 2000 parts with water. Into this bath at 60° C. are entered 100 parts of cotton; after about 10 minutes 50 parts of common salt are added and dyeing is continued for ½ hour at 60° C. The goods are then washed, oxidized in air for 30 minutes, rinsed and soaped. The cotton is thus dyed very fast blue violet tints.

For wool, silk and artificial silk the dyeing process must obviously be varied as may be necessary.

What we claim is:—

1. Unsymmetrical indigoid dyestuffs of the general formula

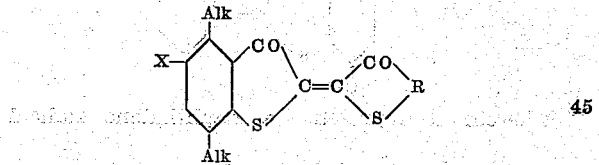

wherein X represents halogen, Alk an alkyl of the lower aliphatic series and R a benzene or naphthalene or anthracene radical, which products form pink to red-brown to red to violet powders which dissolve in concentrated sulfuric acid to blue to blue-green to green solutions, yield with hydrosulfite and caustic soda solution yellow to red to brown vats from which cotton is dyed pink to orange to red-brown to red to violet tints.

2. Unsymmetrical indigoid dyestuffs of the general formula

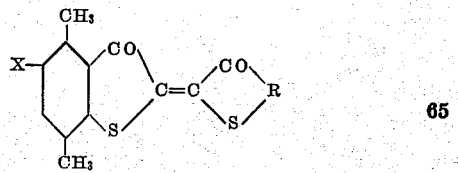

wherein X represents halogen and R a benzene or naphthalene or anthracene radical, which products form pink to red-brown to red to violet powders which dissolve in concentrated sulfuric acid to blue to blue-green to green solutions, yield with hydrosulfite and caustic soda solution yellow to red to brown vats from which cotton is dyed pink to orange to red-brown to red to violet tints.

3. Unsymmetrical indigoid dyestuffs of the general formula

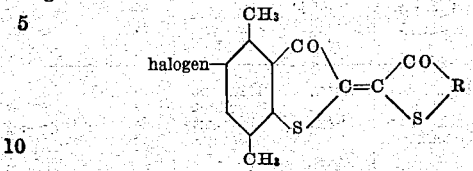

wherein R represents a benzene or naphthalene or anthracene radical, which products form pink to red-brown to red to violet powders which dissolve in concentrated sulfuric acid to blue to blue-green to green solutions, yield with hydrosulfite and caustic soda solution yellow to red to brown vats from which cotton is dyed pink to orange to red-brown to red to violet tints.

4. Unsymmetrical indigoid dyestuffs of the general formula

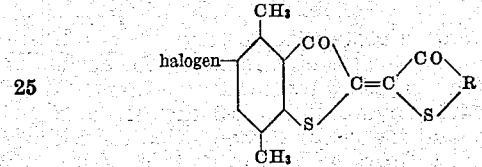

wherein R represents a naphthalene radical which products form red-brown to red to violet powders which dissolve in concentrated sulfuric acid to blue to green solutions, yield with hydrosulfite and caustic soda solution yellow to orange-brown to red vats from which cotton is dyed red-brown to red to violet tints.

5. Unsymmetrical indigoid dyestuffs of the general formula

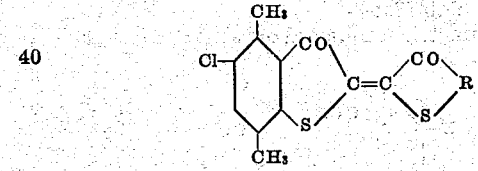

wherein R represents a naphthalene radical which products form red-brown to red to violet powders which dissolve in concentrated sulfuric acid to blue to green solutions, yield with hydrosulfite and caustic soda solution yellow to orange-brown to red to violet tints from which cotton is dyed red-brown to red to violet tints.

6. The unsymmetrical indigoid dyestuff of the formula

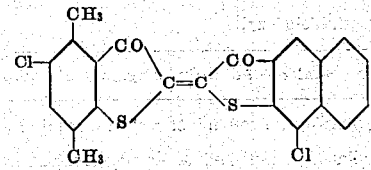

which product forms a red-violet powder which dissolves in concentrated sulfuric acid to a green solution, yields with hydrosulfite and caustic soda solution an orange-brown vat from which cotton is dyed blue-violet tints.

7. The unsymmetrical indigoid dyestuff of the formula

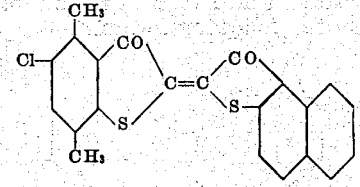

which product forms a dark "Bordeaux red" powder which dissolves in concentrated sulfuric acid to a green solution, yields with hydrosulfite and caustic soda solution a brown-orange vat from which cotton is dyed bluish-Bordeaux red tints.

ERNST STOECKLIN.
HANS VERAGUTH.
FRITZ GRIESHABER.